United States Patent Office 3,773,732
Patented Nov. 20, 1973

3,773,732
POLYMERIZATION PROCESS USING AN ESTER RAMIFYING AGENT AND POLYMERS THEREFROM
Jean-Paul Dillenschneider, Beaumont, France, assignor to Compagnie Generale des Etablissements Michelin, raison sociale Michelin & Cie, Clermont-Ferrand, Puy-de-Pome, France
No Drawing. Filed July 15, 1970, Ser. No. 55,274
Claims priority, application France, July 17, 1969, 6924444
Int. Cl. C08d 5/02, 5/04
U.S. Cl. 260—85.1    11 Claims

ABSTRACT OF THE DISCLOSURE

Star-shaped homopolymers and copolymers of conjugated diene monomer and star-shaped copolymers of conjugated diene monomer with vinylaromatic monomer, having three or four branches and having satisfactory working and low cold flow properties, as well as vulcanizates thereof, having low hysteretic loss, can be prepared by the solution polymerization of the monomers with a monoalkaline anionic initiator or catalyst and treatment of the activated polymers and copolymers with a solution of an ester ramifying or branching agent having therein either a group

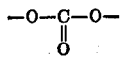

such as ethylene glycol carbonate, or a group

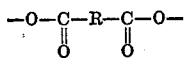

where R is a divalent saturated or unsaturated aliphatic or aromatic hydrocarbon radical, such as dimethyl terephthalate.

---

The present invention relates to improvements in the polymerization of conjugated dienes as well as to their copolymerization, especially with vinylaromatic compounds. More specifically, it is related to improvements in the polymerization or copolymerization of these monomers in solution in a hydrocarbon solvent, under the action of an anionic initiator or catalyst, for example, n-butyl lithium.

As is known, polybutadienes obtained in solution by means of n-butyl lithium initiator have a completely linear molecular structure as well as a distribution of the molecular weight which is very close to an average value depending on the quantity of initiator used. This molecular morphology is at the origin of interesting characteristics, especially the low hysteretic loss of vulcanizates, but also of disadvantages.

One of the disadvantages is the tendency of the linear polybutadienes to flow when cold. The untreated polymers behave like elastomers in viscous liquid condition rather than like solid elastomers. After a few hours they lose their shape, they spread or run. This is quite inconvenient for storage, packing and shipping of the polymers and also for preservation in form of mixtures and semi-finished products (sections, sheets, etc.) which are manufactured from these polymers.

A second disadvantage is that linear polybutadienes are very difficult to handle. When working them, they have a tendency to crumble, they absorb reinforcing charges only with difficulty, and they do not furnish a smooth plastic mass with good homogeneity. As a result, they have been used in practice only in small quantities in mixtures with other elastomers that are easier to work.

Various measures have been proposed to alleviate these disadvantages and to take advantage of the interesting properties of these polymers.

Thus, it has been proposed that the molecular morphology of these polybutadienes be modified by transformation of the linear macromolecules into either cross-linked or ramified macromolecules, by means, for example, of a polyvinyl aromatic compound, such as the divinyl benzene, which is introduced into the reaction medium during polymerization. Indeed, this measure makes it possible to eliminate cold-flowing but it does so to the detriment of the hysteresis properties of the vulcanizates. Moreover, this measure cannot be perfected as it does not allow for regulation as desired of the molecular structure of the polymer and the obtention of a given desired structure that may constitute a better compromise.

It has also been suggested that the molecular morphology of these linear polybutadienes be modified before the completion of polymerization by means of branching or ramifying agents. Towards such effect, there is introduced, while the polymer is still in the activated state in the reaction medium, a multifunctional carrier compound capable of reacting on the carbon-lithium bonds at the end of the macromolecular chain before the completion of polymerization. One thus obtained star-shaped polymers, i.e., polymers the macromolecules of which are formed of several branches joined to a center core or nucleus. However, while the known polymers of this kind are improved from the point of view of cold-flowing, they do not have any markedly different working properties from those of the linear polybutadienes and the vulcanizates have substantially worse hysteresis properties. Moreover, the customarily preferred ramifying agents, especially the polyhalides (tin tetrachloride, silicon tetrachloride, etc.) are unstable as they are highly hydrolyzable. Consequently, it is difficult to control their action, and lacking a safe tool acting under conditions that can be easily reproduced, it becomes difficult to provide polybutadienes with a set of satisfactory qualities.

Another well known means of improving the properties of polybutadienes or polyisoprenes consists in copolymerizing the diene with another monomer, for example, a vinylaromatic compound, most frequently styrene. Thereby, cold-flowing disappears and the working properties are slightly improved. However, introduction of a comonomer, such as styrene, has a harmful influence on hysteresis loss of the vulcanizates. Indeed, if one makes an effort to distribute evenly the styrene along the macromolecular chains, one has to use in the polymerization medium polar compounds which, of course, have the advantage of approximating the reactivities of the two monomers but which at the same time favor the formation of a microstructure of the polymer comprising a high content in vinyl structures. However, if one does not use any polar compounds or very little thereof, the styrene is distributed heterogeneously, whereby its density along the chain increases as such chain is formed, and the chain ends in a polystyrene sequence or block. It is known that a high content of vinyl structures and/or heterogeneity of the macromolecule are responsible for high hysteresis losses of the vulcanizates.

Moreover, the copolymers obtained in solution with n-butyl lithium as an initiator have working properties which are not substantially superior to those of the homopolymer.

The present invention provides for alleviation of these disadvantages and does so by a dual means. Firstly, it employs as ramifying or branching agents compounds which are well defined, stable and can be easily produced, preserved and used, which furnish results that can be fully reproduced and which lead to the obtention of perfectly defined and stable molecular structures. Secondly, it provides for special star-shaped polymer and copolymer structures making it possible in the case of polybutadienes to obtain the optimum set of properties, such as concerns cold-flowing and the ease of working of the crude elastomer and the hysteresis characteristics of the vulcanizate and, in the case of polybutadiene-styrene or polyisoprene-styrene, to substantially improve the working of the crude elastomer and the hysteresis properties of the vulcanizate.

The method in accordance with the invention for the treatment of homopolymers and copolymers of conjugated dienes and copolymers of conjugated dienes with vinyl-aromatic compounds, obtained in solution by means of an anionic initiator, especially n-butyl lithium, and still in activated state, for the purpose of obtention of star-shaped polymers or copolymers by means of a ramifying agent, is characterized in that one uses as the ramifying agent at least one ester compound having in its molecule the

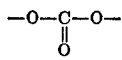

group or the

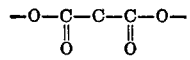

group (whereby R is a divalent saturated or unsaturated aliphatic or aromatic hydrocarbon radical). In a variant, the carbon atoms, or at least one of the carbon atoms in the preceding formulas may be replaced by a silicon atom. Likewise, one or more oxygen atoms may be replaced by a sulfur atom or by a nitrogen atom substituted on its valency which is additional in relation to the oxygen.

The ramifying agents in accordance with the invention is used in such an amount that the ratio of the number of oxygen atoms (or equivalent sulfur or nitrogen atoms) to the number of alkali metal atoms of the monoalkaline anionic initiator is at most 1.5:1 and preferably 1:1 and ranges form about 0.2:1 to about 1.5:1.

For a copolymer, this ratio should be 1:1 or close to 1:1 and ranges from about 0.8:1 to about 1.2:1.

For a homopolymer, this ratio should have a value ranging from about 0.2:1 to about 1.2:1 while the optimum as regards working properties would be close to 1:1 and, as regards hysteresis properties of the vulcanizates, close to 0.6:1. Thus, a preferred range is from about 0.6:1 to about 1:1.

The polymers and copolymers obtained by the method in accordance with the invention have a star-shaped structure with 3 or 4 branches of similar length fixed on a center nucleus by means of stable bonds of the carbon-carbon kind, and they are characterized in that they possess, in comparison to polymers and copolymers which are linear and of the same Mooney plasticity, substantially improved characteristics. The star-shaped homopolymers have characteristics of cold-flowing and working in crude condition which are much superior to the characteristics of the linear polymers even through there is no noteworthy loss of the hysteresis properties of the vulcanized products. The star-shaped copolymers display a susbtantial improvement of working properties in crude state and of the hysteresis properties in vulcanized state.

One of the principles of the invention is based on the discovery that if one adds an ester solution to a solution of an activated polymer, i.e., a polymer having at one of the ends of each chain, bound to a carbon atom, an atom of lithium—or of another alkali metal—the ester function reacts on the carbon-lithium bond, on the one hand by substitution of the alkoxy group and, on the other hand, by addition on the ketonic double bond. The reaction which occurs between an ester of the formula

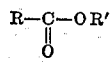

and an activated polymer P—Li in which the lithium atom Li is fixed on the last carbon of the chain P, can be described as follows:

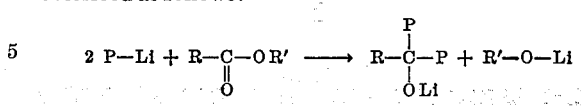

Thus, the ester produces a coupling reaction between two chains P, whereby the reaction is practically instantaneous and practically quantitative at 0° C. temperature.

In accordance with the invention, this fact is taken advantage of in order to obtain, in a stable and reproducible manner, polymers and copolymers which are star-shaped and have 3 or 4 branches, by means of ester compounds containing the group

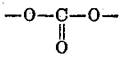

for star-shaped polymers or copolymers with three branches, or the group

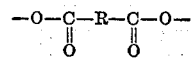

for star-shaped polymers or copolymers with four branches. Each oxygen atom of these groups corresponds to one reactive position facilitating the fixing onto the carbon atom or onto the center core —C—R—C of one chain with a carbanion end.

The respective coupling reactions for preparing three branch star-shaped polymers or copolymers and four branch star-shaped polymers and copolymers may be represented as follows:

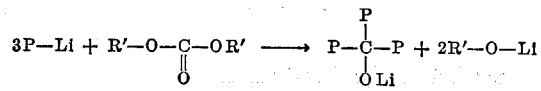

and

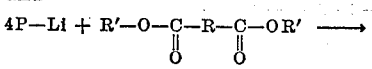

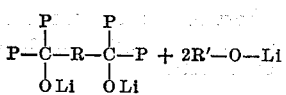

The ramified polymers are recovered after deoxidization or removal of the —O—Li group, for example, by treatment with 4,4′-methylene-bis-2,6(ditertiary-butyl phenol).

Among the ester compounds containing the

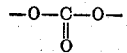

group, the simplest, and therefore the preferred one, is ethylene glycol carbonate having the formula

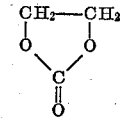

In addition to this compound, one may use all cyclic hydrocarbon ester compounds which are analogous and wherein a hydrogen atom is replaced by an alkyl or aryl group, for example, the carbonates of propylene glycol, of isobutylene glycol, of ethyl ethylene glycol, etc. There can also be used the various hydrocarbon diesters of m-carbonic acid, for example, the dimethyl, diethyl, dipropyl, diisobutyl, ethyl methyl, diisoamyl and diphenyl carbonates.

Among the useful ester compounds containing the

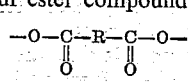

group, there may be mentioned, generally speaking, the diesters derived from the reaction of a dibasic carboxylic acid with a monohydric alcohol, such as, for example, the diesters resulting from the esterification of oxalic, malonic, succinic, glutaric, adipic, pimelic, suberic, terephthalic, ethylmalonic, maleic and malic acids by methyl, ethyl or propyl alcohols or by the phenols.

In this connection, it should be noted that the diesters derived from the reaction of a diol or a polyol with a monobasic carboxylic acid are not suitable for the obtention of star-shaped polymers. Indeed, there is produced a splitting of these diesters having the formula

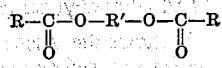

when they react with the carbon-lithium bond of the activated polymer P—Li, in accordance with the following scheme:

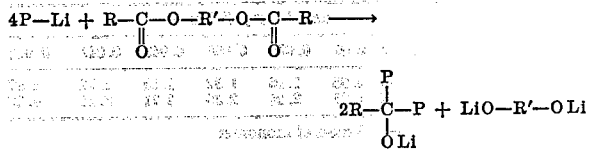

One obtains a simple coupling reaction, such as is the case for a monoester shown hereinbefore.

Consequently, it is not possible to obtain, as one could have expected, star-shaped polymers, for example, by means of tristearates or trioleates of glycerin.

Using the means in accordance with the invention, it would be possible to obtain star-shaped polymers or copolymers with more than four branches, by using, for example, a triester resulting from the reaction of a tribasic acid with a monohydric alcohol, or, more generally, a compound comprising more than two

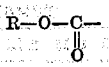

groups connected to a center nucleus.

However, and this is another principle of the invention, it has been found that it is advisable to limit oneself to star-shaped polymers with three or four branches. More specifically, the optimum number of branches is 3 for copolymers and 3 or 4 for homopolymers, depending on whether one wishes to stress the hysteresis properties of the vulcanized product or the working properties of the elastomer in crude condition. In any case, the hysteresis characteristics of the vulcanizates undergo an unacceptable deterioration if more than four branches of substantially identical length are joined around one center nucleus.

As concerns the quantity of ramifying or branching agent to be used, it will be found that the important factor is the ratio of the number of oxygen atoms present in the ketone functions and alkoxy functions (or the number of equivalent atoms) to the number of atoms of alkali metal. If this ratio is 1:1, the quantity of ramifying agent corresponds theoretically to the complete transformation of the linear activated polymer or copolymer into deactivated star-shaped polymer. This is substantially what experience has shown. If the quantity of ramifying agent used is such that this ratio is less than 1:1, one obtains a mixture of star-shaped polymer and linear polymer in proportions that will depend on the magnitude of the oxygen/lithium relationship. Experience has shown that it is for a value close to 0.6:1 for this relationship that one obtains the best hysteresis properties of vulcanized products in the case of homopolymers. On the other hand, it is for a value around 1:1 of this relationship that one obtains the best properties as regards to cold flow and working. Furthermore, it has been found that for copolymers, it is for a value close to 1:1 that one obtains the best properties both for working in crude condition and heating in vulcanized condition, as a result, it appears, of the grouping in the center of the star of the heterogeneities present in the various linear chains. In all cases, it is important to avoid use of an oxygen/lithium ratio higher than about 1:1 as in such a case, the resulting polymer structure depends upon the operating conditions. According to whether the ramifying agent is introduced all at once or in several portions, the proportions of molecules with 3 or 4 branches of coupled linear molecules or of non-modified linear molecules will vary considerably. It goes without saying that if an excess of ramifying agent is used and if such agent is added when all or almost all of the modifyable polymer has been modified, this amounts to use of a stoichiometric proportion.

The monomers that can be employed for preparation of star-shaped polymers or copolymers in accordance with the invention comprise by preference, as concerns conjugated dienes, those that contain from 4 to 12 carbon atoms, for example, 1,3 butadiene, isoprene, piperylene, 2-phenyl - 1,3 - butadiene, 2,3 - dimethyl - 1,3 - butadiene and similar compounds, and as concerns vinyl-aromatic compounds, styrene, chloro and methoxy styrene, the vinyl naphthalenes and their derivatives substituted with an alkyl or aryl radical, or the like.

The preferred monomers are butadiene, isoprene and styrene. Polymers and copolymers specifically aimed at are polybutadiene, polybutadiene styrene, polyisoprene styrene, the latter with a predominant share of butadiene or isoprene. One may also apply the invention to terpolymers, for example, butadiene-isoprene-styrene.

The anionic initiators that may be used in the method in accordance with the invention are organic derivatives which are monoalkaline, such as RM, R being an aliphatic, cycloaliphatic or aromatic hydrocarbon radical and M being lithium, sodium or potassium. The organic lithium compounds, RLi, which are soluble in the organic solvents used are preferred. Among the lithium compounds that may be used, there may be mentioned especially n-butyl lithium, secondary-butyl lithium, phenyl lithium, etc.

The quantity of initiator to be used varies in accordance with the molecular weight desired for the final product. In practice, the initiator concentration ranges from 0.020 to 0.50 weight parts per 100 weight parts of monomer. In order to obtain rubbery polymers with a (1'+4') Mooney plasticity at 100° C. close to 50, after treatment with the ramifying agents, the preferred quantity of initiator used ranges from 0.03 to 0.15 weight parts per 100 weight parts of monomer.

Polymerization may take place at a temperature ranging from —70° C. to 150° C., whereby such temperature may vary considerably, depending upon the nature of the solvent used.

As a solvent or diluent one may use various aliphatic, cycloaliphatic or aromatic hydrocarbons. Examples of diluents that can be used are heptane, cyclohexane, benzene, toluene, pentene, hexane and isooctane. The temperatures preferred for these solvents range from 0° C. to 70° C. In the case of copolymerization, one may also use mixtures of the aforeindicated solvents with polar compounds, such as the oxide ether (tetrahydrofuran, diethyl ether, diphenyl oxide, etc.) in a concentration of 0 to 50 weight parts per 100 parts of solvent. One may also use polar adjuvants, such as tertiary amines, or hexamethyl phosphorotriamide.

The monomer concentration in the polymeriztion medium may vary from 0.05 to 0.3 parts by weight thereof.

The duration of the polymerization is a function of the nature of the solvent, the concentration of monomer and initiator, and the temperature of polymerization. Usually it ranges from 1 to 5 hours.

At the end of polymerization, or possibly during polymerization, the ramifying agent is added to the reaction medium, without any modification in the operating conditions, especially the temperature. For temperatures higher than 0° C., the reaction is immediate.

The ramifying agent is added dissolved in an aromatic diluent (benzene, toluene) or in an aliphatic or cycloaliphatic diluent. Any impurities containing mobile hydrogens or groups capable of reacting on the organometal bonds of the carbon-lithium type must be carefully eliminated so as not to deactivate the polymer. Preferably, the ramifying agent is left in contact with the polymer during 15 to 30 minutes so as to homogenize the medium.

Of course, several variants of the method in accordance with the invention may be applied to the basic procedure.

Thus, for example, the ramifying agent may be introduced, especially in case of homopolymers, in one or more portions during polymerization instead of at the end of polymerization. In this manner, one obtains a polymer which comprises linear macromolecules and star-shaped macromolecules, the latter formed of branches which are shorter than the linear chains. Evidently, it is advisable that the polymer not be totally deactivated if continuation of the growth of some of the molecules is desired.

The same result as described above can be obtained if together with the ramifying agent, one uses a monoester, a lactone or a diester obtained by means of reaction of a monobasic acid and a diol. However, in the latter case, the linear portion of the modified polymer is composed of molecules the center part of which has been formed last, which may be of interest in the case of copolymers.

It is also possible to employ a mixture of ramifying agents, one producing star-shaped polymers with three branches and the other one producing star-shaped polymers with four branches, possibly in association with a coupling agent.

In accordance with another variant, the star-shaped fraction of the polymer may be given an asymmetrical shape, i.e., it may consist of macromolecules which are star-shaped and the branches of which are of different lengths. This may be obtained by having the ramifying agent react with a polymer or a copolymer comprising two or more types of macromolecules, differing from one another in the average length of their chains. Another asymmetry may be introduced by using mixtures of copolymers of different monomers with which one causes one or more ramifying agents to react. Thereby one may obtain star-shaped copolymers comprising branches formed of polybutadiene-styrene or branches formed of polyisoprene-styrene, or also branches formed of a copolymer and branches formed of a homopolymer.

These different variants are easily prepared and are rendered possible by the remarkable properties of the ramifying agent in accordance with the invention, namely, the different compounds indicated may actually be obtained with a high degree of purity; they are stable under customary conditions and easily soluble in organic solvents; their reactivity with activated polymers ending in a carbon-alkali metal bond is high. Consequently, it is easy to provide and obtain such polymer structures as may be desired, and consequently, to determine the star-shaped polymer structures that may yield the most interesting properties. Here one has available a tool for shaping of polymers which is both precise and safe.

The present invention will be illustrated by the following examples describing the preparation of various star-shaped polymers as well as the properties of star-shaped polymers chosen among the most interesting or important.

EXAMPLE 1

Into Steinie bottles of 250 cc. one introduces successively 180 cc. purified heptane
20 cc. (13 g.) butadiene
n-butyl lithium (BuLi) in a variable quantity.

The bottles are placed in a bath at 60° C. and agitated for two hours. At that time, all of the monomer has been polymerized and one introduces into various bottles a given quantity of an agent chosen among dimethyl terephthalate (TPM), ethylene glycol carbonate (CEG), methyl benzoate (BM), in the form of a 50 g./liter solution in benzene. After one half hour of agitation at 60° C., one recovers the polymer obtained in the different flasks after deoxidation with 1% of 4,4'-methylene-bis-2,6(di-tertbutyl phenol). In all cases, polymerization is practically quantitative. One measures the inherent viscosity of the polymer obtained ( in toluene with a concentration of 1 g./liter). The results obtained are as follows:

(1) With TPM (dimethyl terephthalate)

The following table shows the viscosity of the polymer at the end of polymerization, before and after addition of TPM, for various concentrations of initiator, wherey the molar ratio TPM/butyl lithium is in all cases 0.25.

| | mcM [1] butyl lithium | | | | | | | |
|---|---|---|---|---|---|---|---|---|
| | 0.178 | 0.120 | 0.09 | 0.071 | 0.058 | 0.049 | 0.042 | 0.022 |
| $\eta_0$ | 0.59 | 0.75 | 0.95 | 1.16 | 1.32 | 1.63 | 1.72 | 2.57 |
| $\eta$ | 1.14 | 1.42 | 1.81 | 2.06 | 2.36 | 2.71 | 3.14 | 4.07 |

[1] 1 mcM is one mol per 100 mols of monomer.

As we see, the inherent viscosity is multiplied by a substantially constant factor close to 1.80 if TPM is added. Therefore, this product provides for a uniform modification of the molecular weight and structure of the polymer.

The following table indicates for a uniform concentration of 0.08 mcM of n-butyl lithium the variation in inherent viscosity as a function of the TPM/butyl lithium ratio, i.e., of the fourth part of the ratio of the number of oxygen atoms deriving from the TPM and of the number of lithium atoms deriving from butyl lithium.

| | TPM/BuLi=¼ O/Li | | | | | | | | |
|---|---|---|---|---|---|---|---|---|---|
| | 0 | 0.05 | 0.15 | 0.20 | 0.25 | 0.30 | 0.50 | 1 | 2 |
| $\eta$ | 1.02 | 1.19 | 1.60 | 1.72 | 1.82 | 1.75 | 1.74 | 1.68 | 1.59 |

As we see, the inherent viscosity is maximal for a ratio of O/Li equalling 1:1 or close to 1:1.

Direct measures of average molecular masses by weight MW for a non-modified polymer and for the same polymer when modified have furnished the following results:

| Test | $\eta$ | TPM/BuLi | MW |
|---|---|---|---|
| 1 | 1.10 | 0 | 400,000 |
| 2 | 1.90 | 0.25 | 1,300,000 |
| 3 | 1.94 | 0.25 | 1,600,000 |
| 4 | 1.91 | 0.25 | 1,500,000 |

As may be seen, the TPM leads to almost a quadrupling of the molecular weight which may be explained by the formation of a star-shaped polymer with four branches.

(2) With CEG (ethylene glycol carbonate)

The following table furnishes for a concentration of 0.09 mcM butyl lithium the inherent viscosity for various values of the molar ratio CEG/BuLi equalling one third of the ratio O/Li, i.e., the number of oxygen atoms deriving from CEG to the number of lithium atoms deriving from the active BuLi.

| | CEG/BuLi=⅓ O/Li | | | | |
|---|---|---|---|---|---|
| | 0 | 0.10 | 0.20 | 0.33 | 0.50 |
| $\eta$ | 0.98 | 1.17 | 1.47 | 1.56 | 1.42 |

As may be seen, for equality of the ratio O/Li, for example, for O/Li=0.60, CEG produces less of an increase of inherent viscosity than TPM. On the other hand, like for TPM, maximum inherent viscosity is obtained for a value of the ratio O/Li equalling 1:1 or close to 1:1.

(3) With BM (methyl benzoate)

The following table indicates, for a BuLi concentration of 0.049 mcM, as a function of the ratio BM/BuLi=½

O/Li, the inherent viscosity of the modified polymer as follows:

| BM/BuLi=½ O/Li | | | | | | | |
|---|---|---|---|---|---|---|---|
| 0 | 0.10 | 0.20 | 0.30 | 0.40 | 0.45 | 0.50 | 0.75 |
| η......... 1.49 | 1.58 | 1.69 | 1.89 | 2.02 | 2.10 | 2.22 | 2.10 |

Here, too, the maximum inherent viscosity is produced for a ratio O/Li of 1:1 or close to 1:1.

If one compares the inherent maximum viscosity $\eta_{max}$ (for O/Li=1) with the initial viscosity $\eta_0$ (for O/Li=0) in the three cases, one obtains the following results:

| | BM | CEG | TPM |
|---|---|---|---|
| $\eta_{max}/\eta_0$ | 1.49 | 1.59 | 1.78 |

The value of 1.49 must be compared with the value obtained with triacetoxy 1,2,4-benzene which is 1.48. This confirms that the action of a polyester obtained from a polyol and a monobasic carboxylic acid is identical to that of a monoester.

The different action of TPM, CEG and BM on the macrostructure of the polybutadienes may also be characterized by a different correspondence between the inherent viscosity and the (1'+4') Mooney plasticity at 100° C. The following table shows this correspondence for a ratio of O/Li=1.

| | Inherent viscosity | | | | | | |
|---|---|---|---|---|---|---|---|
| | 1.40 | 1.60 | 1.80 | 2 | 2.20 | 2.40 | 2.60 |
| | Corresponding (1'+4') Mooney values at 100° C. | | | | | | |
| Linear polybutadiene | <10 | 13 | 19 | 27 | 38 | 51 | 66 |
| BM-modified polybutadiene | <10 | 14 | 19 | 26 | 42 | 53 | 73 |
| CEG-modified polybutadiene | 26 | 36 | 44 | 52 | 62 | 71 | 83 |
| TPM-modified polybutadiene | 36 | 45 | 54 | 65 | 77 | 96 | >100 |

One will notice the identity between the non-modified linear polybutadiene and the polybutadiene modified with methyl benzoate. This table is moreover proof of a difference in macrostructure between the linear polybutadienes (possibly modified with methyl benzoate) and the star-shaped polybutadienes with three or four branches modified, respectively, with CEG and with TPM.

EXAMPLE 2

This example proposes to show several variants of the use of ramifying agents.

(1) Introduction of the reagent in the course of the reaction

One introduces into some 250 cc. Steinie flasks
180 cc. heptane
20 cc. butadiene
0.054 mcM or 0.094 mcM BuLi.

The flasks are agitated at 60° C. in a polymerization tank. After various periods of time, one introduces a quantity of CEG corresponding to O/Li of 0.60. The following table shows the evolution of viscosity between the time at which the CEG is introduced and the time at which polymerization is completed.

| mcM | Time of Introduction of CEG (minutes) | Conversion on introduction of CEG (percent) | Viscosity on introduction of CEG | Final viscosity |
|---|---|---|---|---|
| 0.054 | 15 | 25 | 0.61 | 1.72 |
| | 30 | 63 | 0.96 | 1.72 |
| | 45 | 83 | 1.17 | 1.64 |
| | 90 | 100 | 1.28 | 1.80 |
| 0.094 | 15 | 32 | 0.48 | 1.29 |
| | 30 | 64 | 0.76 | 1.21 |
| | 45 | 88 | 0.87 | 1.18 |
| | 90 | 100 | 0.92 | 1.28 |

As we see, one obtains a great variety of polymers.

(2) Use of several different reagents

One introduces into some 250 cc. Steinie flasks
180 cc. heptane
20 cc. butadiene
butyl lithium in various quantities.

Following polymerization, after two hours at 60° C., one introduces a mixture of TPM and CEG in various proportions but always maintaining the O/Li ratio at a value of 1. After 30 minutes agitation at 60° C., the polymer is deoxidized and recovered. The table below indicates the initial and final values of inherent viscosity, i.e., before and after reaction of the CEG and the TPM.

| mcM | TPM/CEG= | 0.3 | 0.5 | 0.7 | 1 |
|---|---|---|---|---|---|
| 0.0945 | $\eta_0$ | 0.81 | 0.85 | 0.80 | 0.81 |
| | $\eta$ | 1.37 | 1.40 | 1.39 | 1.47 |
| 0.0697 | $\eta_0$ | 1.03 | 1.03 | 0.96 | 1.05 |
| | $\eta$ | 1.75 | 1.78 | 1.74 | 1.84 |
| 0.0546 | $\eta_0$ | 1.34 | 1.30 | 1.45 | |
| | $\eta$ | 2.22 | 2.23 | 2.53 | |

Here again, a great variety of polymers is obtained.

(3) Modification of bidispersed polymers

Into a 250 cc. Steinie flask one introduces:
180 cc. heptane
20 cc. butadiene
butyl lithium After two hours one obtains at 60° C. five different polybutadienes, A, B, C, D, E, depending on the butyl lithium concentrations, which show the following inherent viscosities:

| Polymer | A | B | C | D | E |
|---|---|---|---|---|---|
| mcM | 0.037 | 0.165 | 0.112 | 0.082 | 0.064 |
| $\eta$ | 2.20 | 0.57 | 0.75 | 0.97 | 1.12 |

One mixes A+B, A+C, A+D, A+E at a 50:50 proportion by weight. Following homogenizing, one adds CEG in a quantity such that the ratio O/Li=1. The flasks are agitated during 30 minutes at 60° C. and the polymers are then deoxidized and recovered. This is how the inherent viscosity develops:

| Polymer | $\eta_0$ (initial viscosity) | $\eta$ (final viscosity) |
|---|---|---|
| A plus B | 1.27 | 1.98 |
| A plus C | 1.46 | 2.08 |
| A plus D | 1.53 | 2.28 |
| A plus E | 1.60 | 2.47 |

EXAMPLE 3

This example shows that copolymers can be modified in the same manner as homopolymers by means of the method in accordance with the invention.

One introduces into 250 cc. Steinie flasks
180 cc. heptane
14 cc. butadiene
3.4 cc. styrene
some n-butyl lithium in variable quantities
0.5 cc. of a solution of tetrahydrofuran in heptane at the ratio of 130 g. per liter.

The flasks are placed in a bath of 50° C. and agitated for 4 hours and 20 minutes. Thereafter, one introduces either methyl benzoate (BM) or ethylene glycol carbonate (CEG) in form of solutions of 10 g./liter of toluene, in such a quantity that the ratio O/Li=1. After 30 minutes of agitation at 60° C., the polymer is deoxidized then recovered by stripping. The conversion is maximal. The results obtained are as follows:

(1) With BM

|  | pcM[1] of BuLi | | |
| --- | --- | --- | --- |
|  | 0.078 | 0.066 | 0.052 |
| $\eta_0$ | 0.91 | 1.08 | 1.23 |
| $\eta$ | 1.42 | 1.63 | 1.91 |

The increase in inherent viscosity is about 50% to 55%.

(2) With CEG

|  | pcM of BuLi | | | | | |
| --- | --- | --- | --- | --- | --- | --- |
|  | 0.130 | 0.095 | 0.074 | 0.066 | 0.052 | 0.042 |
| $\eta_0$ | 0.58 | 0.72 | 0.94 | 1.12 | 1.22 | 1.35 |
| $\eta$ | 0.92 | 1.24 | 1.50 | 1.85 | 2 | 2.20 |

The increase in inherent viscosity is larger and is about 60% to 65%.

All polymers obtained are free of gel.

One may also prepare random star-shaped copolymers by using hexamethyl phosphorotriamide. One uses:

180 cc. heptane
14 cc. butadiene
3.4 cc. styrene
n-butyl lithium in variable quantity
hexamethyl phosphorotriamide (HMPT) in the same molar quantity as the n-butyl lithium.

The bottles are agitated at 15° C. for 2 hours 30 minutes. Thereafter, one introduces CEG in quantities such that O/Li=1. After 30 minutes of agitation at 15° C., the solution is deoxidized and the polymer is recovered. The increase in inherent viscosity is from 50% to 55%, as shown by the following table:

|  | pcM of BuLi | | |
| --- | --- | --- | --- |
|  | 0.062 | 0.050 | 0.040 |
| $\eta_0$ | 1.05 | 1.15 | 1.42 |
| $\eta$ | 1.53 | 1.82 | 2.18 |

EXAMPLE 4

The purpose of this example is to compare the properties of the various polybutadienes in accordance with the invention and of their vulcanizates with various known polybutadienes.

The various polybutadienes considered have all substantially the same 1'+4') Mooney plasticity at 100° C., i.e., approximately 50.

Polybutadiene A is a commercial polybutadiene with more than 85% of cis-1,4 microstructure obtained in solution by means of a catalyst of the trialkyl aluminum type, titanium tetrachloride and iodine carrier.

Polybutadiene B is a commercial polybutadiene obtained in solution with n-butyl lithium as initiator and cross-linked with divinyl benzene.

Polybutadiene C is a commercial polybutadiene obtained in solution with n-butyl lithium as initiator and ramified by means of tin tetrachloride.

Polybutadiene T is a control polybutadiene obtained in solution with n-butyl lithium as initiator. This polybutadiene is linear.

Polybutadienes PB 4 x 100 and PB 4 x 60 are star-shaped polybutadienes in accordance with the invention, with four chains or branches.

Polybutadienes PB 3 x 100, PB 3 x 75 and PB 3 x 60 are star-shaped polybutadienes in accordance with the invention, with three chains or branches.

In order to prepare the polybutadienes in accordance with the invention and the linear control polybutadiene, one uses the following proportions of substances:

180 cc. heptane
20 cc. butadiene
n-butyl lithium as shown in the table below:

| Polybutadiene | mcM of BuLi | Ramifying agent and proportion of O/Li |
| --- | --- | --- |
| T | 0.0250 |  |
| PB 4 x 100 | 0.0945 | TPM, 1 |
| PB 4 x 60 | 0.0445 | TPM, 0.60 |
| PB 3 x 100 | 0.0575 | CEG, 1 |
| PB 3 x 75 | 0.0510 | CEG, 0.75 |
| PB 3 x 60 | 0.0400 | CEG, 0.60 |

Polymerization is effected at 60° C. during two hours with agitation. Thereafter, one introduces into the solution dimethyl terephthalate (TPM) for the PB 4 x 100 and PB 4 x 60, and ethylene glycol carbonate (CEG) at the ratio indicated above. One continues to agitate at 60° C. for one half hour. Thereafter, the polymers are deoxidized with 1% 4,4' - methylene - bis - 2,6(diterbutyl phenol) and recovered by stripping.

After measuring the inherent viscosity, the Mooney plasticity and the dimensional stability in crude condition, one prepares vulcanizates from the various elastomers by means of mixtures as follows:

| | |
| --- | --- |
| Polymer | 100 |
| Stearic acid | 2 |
| ZnO | 3 |
| Antiozonant | [1] 1 |
| HAF black | 50 |
| Oil | 5 |
| Accelerator | 1 |
| Sulfur | 1.6 |

[1] N-isopropyl-N'-phenyl para-phenylene diamine.

Curing 40 minutes at 144° C.

The following table shows the characteristics of the different elastomers. The polybutadienes in accordance with the invention show a very definite improvement in working conditions in comparison to the linear control T and the commercial Polybutadienes A, B, C, including the non-linear Polybutadienes B and C. The improvement is more substantial for the polybutadienes with 4 chains or branches than for the polybutadienes with three chains or branches, and it increases as the degree of branching increases. Specifically, the PB 4 x 100 easily hugs the tool at 50° C. and furnishes a rotating pad; its aspect is smooth and shiny. As such, it has working characteristics which are comparable to those of the best synthetic rubbers.

As may be seen in the table, the PB 4 x 60, PB 3 x 60 and PB 3 x 75 have heating characteristics (hysteretic losses, flexometer) which are almost as good as those of the linear control T and much superior to those of the commercial Polybutadienes A, B, C. On the other hand, they have very much improved dimensional stability if compared to that of the linear control T and comparable to the dimensional stability of the Polybutadienes B and C, as all the polybutadienes in accordance with the invention. Moreover, their working characteristics are much improved and in this respect, they are exceeded only by the Polybutadienes PB 4 x 100 and PB 3 x 100 as per the invention.

TABLE I

|  | A | B | C | T | PB 4 x 100 | PB 4 x 60 | PB 3 x 100 | PB 3 x 75 | PB 3 x 60 |
|---|---|---|---|---|---|---|---|---|---|
| Properties in crude state: | | | | | | | | | |
| Inherent viscosity | | | | 2.22 | 1.63 | 2.26 | 1.98 | 2.09 | 2.31 |
| Mooney plasticity | 46 | 45 | 45 | 48 | 52 | 51 | 49 | 56 | 53 |
| Dimensional stability (g.) | 1.13 | 0.76 | 0.44 | 1.41 | 0.18 | 0.46 | 0.25 | 0.28 | 0.70 |
| Properties in vulcanized condition: | | | | | | | | | |
| Modulus at 100%, kg./cm.$^2$ | 17.1 | 19.8 | 17.5 | 23.3 | 16.9 | 21.0 | 18.8 | 20.6 | 20.9 |
| Modulus at 300%, kg./cm.$^2$ | 55.8 | 66.9 | 64.6 | 73.2 | 59.8 | 72.7 | 64.4 | 68.8 | |
| Hysteretic loss in percent: | | | | | | | | | |
| At 20° C | 28.7 | 30.3 | 31.0 | 25.1 | 31.5 | 26.8 | 26.8 | 27.3 | 26.9 |
| At 60° C | 25.3 | 28.6 | 27.7 | 22.0 | 27.8 | 23.6 | 24.2 | 24.3 | 23.6 |
| At 100° C | 21.9 | 23.0 | 24.9 | 18.6 | 24.9 | 20.6 | 20.9 | 20.9 | 20.1 |
| Scott breakage: | | | | | | | | | |
| Rupture elongation, percent | 570 | 285 | 380 | 280 | 380 | 320 | 370 | 305 | 355 |
| Breaking strain, kg./cm.$^2$ | 168 | 78 | 103 | 78 | 101 | 95 | 102 | 80 | 109 |
| ISO hardness | 67 | 69 | 67 | 73 | 65 | 70 | 68 | 71 | 72 |
| Goodrich flexometer: | | | | | | | | | |
| Initial compression, percent | 16.4 | 14.5 | 14.5 | 11.6 | 15.5 | 12.6 | 14.3 | 13.7 | 12.2 |
| Heating, ° C | 46 | 51 | 58 | 37 | | 40 | 49 | 45 | 40 |

EXAMPLE 5

The purpose of this example is to compare various butadiene-styrene copolymers in accordance with the invention with various butadiene and styrene copolymers.

Towards such end, one uses as reference various commercial elastomers as well as linear elastomers prepared in accordance with known techniques.

The various copolymers of butadiene and styrene which have been compared are defined as follows:

Copolymers E and E' are commercial butadiene-styrene copolymers of the type 1500, prepared in emulsion. They differ from one another only by the fact that they come from different lots.

Copolymers S and S' are likewise commercial butadiene-styrene copolymers prepared in solution and they differ only in that they come from different lots.

Copolymers STL and STE are butadiene-styrene copolymers prepared in solution with butyl lithium and with HMPT, whereby one, the STL, is the linear reference and the other one, STE, is a star-shaped copolymer in accordance with the invention, with three branches. These copolymers were prepared by means of the following proportions:

188 cc. heptane
14 cc. butadiene
3.4 cc. styrene
n-butyl lithium at a ratio of 0.038 pcM for STL and 0.052 pcM for STE
HMPT at the same molar ratio as BuLi Temperature: 30° C.
Duration of polymerization: 1 hour 30 minutes.

In the case of STE, one adds at the end of polymerization some CEG at such a proportion that the ratio O/Li=1, and one continues to agitate during one half hour.

Copolymers RL and RE are butadiene-styrene copolymers prepared in solution with butyl lithium, in the presence of tetrahydrofuran, whereby polymerization is arrested before complete polymerization of the styrene. Copolymer RL is a linear reference product. Copolymer RE is a star-shaped copolymer in accordance with the invention with three branches. Preparation comprises the following:

180 cc. heptane
13.8 cc. butadiene
4.46 cc. styrene
0.5 cc. solution of tetrahydrofuran in heptane at the ratio of 130 g./liter
n-butyl lithium at the ratio of 0.029 pcM for BL and 0.052 pcM for RE.

Temperature: 50° C.

Polymerization was arrested at 92% to 94% of conversion in order to prevent the formation of a terminal styrene block. For RE, one thereafter introduces CEG in such a proportion as to render O/Li=1.

Copolymers BL, BLL, and BE are copolymers prepared in the presence of tetrahydrofuran. However, polymerization is carried to full conversion. The following polymerization formula is used:

180 cc. heptane
14 cc. butadiene
3.4 cc. styrene
0.5 cc. solution of tetrahydrofuran in heptane of 130 g./liter
n-butyl lithium at the ratio of
   0.032 pcM for BL,
   0.066 pcM for BLL, and
   0.074 pcM for BE.

Duration: 4 hours.
Temperature: 50° C.

In the case of BL, the copolymer obtained was not modified in any manner so that the copolymer is linear. As regards the copolymer BLL, it was treated at the end of polymerization with methyl benzoate which was used in a proportion such that O/Li=1. Thus, this copolymer is linear and formed of coupled chains. Finally, the copolymer BE was treated with ethylene glycol carbonate, again at a ratio corresponding to O/Li=1, and this copolymer thus is a star-shaped copolymer with three branches.

The Tables II and III illustrate the comparison of the characteristics of the various copolymers described above. The properties in vulcanized condition were measured on vulcanized products obtained with the same mixture formula as in Example 4, with vulcanization continuing for 60 minutes at 144° C.

TABLE II

|  | E | S | STL | STE | RL | RE |
|---|---|---|---|---|---|---|
| Properties in crude state: | | | | | | |
| Inherent viscosity | | | 1.72 | 1.68 | 1.78 | 1.70 |
| (1'+4') Mooney at 100° C. | 55 | 60 | 48 | 50 | 42 | 52 |
| Percent styrene | 25 | 24 | 25 | 25 | 26 | 26 |
| Percent 1-2 | 17 | 30 | 50 | 49 | 26 | 26 |
| Percent trans 1-4 | 67 | 42 | 35 | 35 | 49 | 49 |
| Properties in vulcanized condition: | | | | | | |
| Modulus at 100%, kg./cm.$^2$ | 17.1 | 19.6 | 22.5 | 22.1 | 24.8 | 22.1 |
| Modulus at 300%, kg./cm.$^2$ | 84.8 | 89.2 | 98.3 | 107.0 | 106.1 | 107.7 |
| Hysteretic loss in percent: | | | | | | |
| At 20° C | 42.1 | 38.4 | 41.5 | 40.5 | 38.9 | 34.2 |
| At 60° C | 33.1 | 33.8 | 33.4 | 31.1 | 30.7 | 26.2 |
| At 100° C | 25.5 | 26.7 | 24.8 | 23.5 | 22.9 | 20.2 |
| Scott breakage: | | | | | | |
| Rupture elongation, percent | 570 | 517 | 487 | 490 | 470 | 433 |
| Breaking strain, kg./cm.$^2$ | 265 | 230 | 215 | 232 | 214 | 211 |
| ISO hardness | 64 | 68 | 71 | 69 | 74 | 70 |
| Goodrich flexometer: | | | | | | |
| Initial compression percent | 18.1 | 16.9 | 16.5 | 16.5 | 13.1 | 15.1 |
| Heating, ° C | 47 | 47.5 | 41.5 | 39.5 | 36 | 37 |

TABLE III

|  | E' | S' | BL | BLL | BE |
|---|---|---|---|---|---|
| Properties in crude condition: |  |  |  |  |  |
| Inherent viscosity | | | 1.65 | 1.50 | 1.55 |
| (1'+4') Mooney at 100° C | 55 | 60 | 67 | 49 | 50 |
| Percent styrene | 25 | 24 | 26 | 26 | 26 |
| Percent 1-2 | 17 | 30 | 26 | 26 | 26 |
| Percent trans 1-4 | 67 | 42 | 49 | 50 | 51 |
| Properties in vulcanized condition: |  |  |  |  |  |
| Modulus at 100%, kg./cm.² | 19.2 | 20.9 | 22.8 | 21.3 | 22.5 |
| Modulus at 300%, kg./cm.² | 97.5 | 101.5 | 98.7 | 107.7 | 101.3 |
| Hysteretic loss in percent: |  |  |  |  |  |
| At 20° C | 40.9 | 40.2 | 38 | 37.5 | 33.6 |
| At 60° C | 32.3 | 33.3 | 31.2 | 28 | 26 |
| At 100° C | 24.5 | 26.7 | 24 | 22.7 | 19.5 |
| Scott breakage: |  |  |  |  |  |
| Rupture elongation, percent | 533 | 527 | 463 | 473 | 443 |
| Breaking strain, kg./cm.² | 267 | 245 | 202 | 214 | 223 |
| ISO hardness | 65 | 70 | 74 | 70 | 68 |
| Goodrich flexometer: |  |  |  |  |  |
| Initial compression, percent | 16.1 | 15.2 | 12.8 | 14.8 | 14.2 |
| Heating, °C | 47 | 47 | 41 | 38 | 40 |

As shown by Tables II and III, the star-shaped copolymers STE, RE and BE in accordance with the invention have better hysteresis properties than the corresponding linear references STL, RL and BL, and the commercial copolymers E, S or E' and S'. The improvement is especially noteworthy for the polymers comprising a polystyrene block. In this connection, it may be stated that copolymers BL and BLL are not much different from each other even though in the copolymer BLL, the polystyrene block occupies a center position. Therefore, it appears that the essential principle of improvement is to be attributed to the star-shaped structure.

Furthermore, the star-shaped copolymers STE, RE and BE show working properties which are much improved over those of linear copolymers STL, RL, BL or BLL. Specifically, copolymers RE and BE can be worked with substantially as much ease as the SBR produced in emulsion, which are well known, and they could be used in mixtures without being associated with other especially easy-to-handle elastomers.

In this example, there were considered only star-shaped copolymers with three branches, obtained by means of a ramifying agent in a quantity procuring the maximum degree of branching. Other tests show that a smaller degree of ramification or a number of branches higher than three leads to less favorable hysteresis properties. The structure resulting from the grouping of three branches seems superior, especially to the structure resulting from the grouping of two or four branches.

It will be appreciated that various modifications and changes may be made in the process and product of the invention in addition to those disclosed above by those skilled in the art without departing from the essence of the invention and that accordingly the invention is to be limited only within the scope of the appended claims.

What is claimed is:

1. In the process for the preparation of star-shaped homopolymers and copolymers of conjugated diene monomer star-shaped copolymers of conjugated diene monomer with vinylaromatic monomer by the solution polymerization of the monomer with a monolithium initiator and the coupling reaction of the activated homopolymer or copolymer with a ramifying agent, the improvement which comprises using as the ramifying agent a solution of at least one carbonate selected from the group consisting of a cyclic hydrocarbon ester of meta-carbonic acid and a hydrocarbon diester of meta-carbonic acid, the ratio of O/Li of the number of oxygen atoms O in the ramifying agent to the number of lithium atoms Li in the monolithium initiator being from about 0.2:1 to about 1.5:1, whereby such star-shaped polymers are produced having three branch chains.

2. In the process for the preparation of star-shaped homopolymers and copolymers of conjugated diene monomer and star-shaped copolymers of conjugated diene monomer with vinylaromatic monomer by the solution polymerization of the monomer with a monolithium initiator and the coupling reaction of the activated homopolymer or copolymer with a ramifying agent, the improvement which comprises using as the ramifying agent a solution of at least one glycol carbonate, the ratio of O/Li of the number of oxygen atoms O in the ramifying agent to the number of lithium atoms Li in the monolithium initiator being from about 0.2:1 to about 1.5:1, whereby such star-shaped polymers are produced having three branch chains.

3. The process as defined by claim 2 wherein the ramifying agent is ethylene glycol carbonate.

4. The process as defined by claim 2 wherein the ramifying agent is propylene glycol carbonate.

5. The process as defined by claim 2 wherein the ramifying agent is isobutylene glycol carbonate.

6. The process as defined by claim 2 wherein the ramifying agent is ethyl ethylene glycol carbonate.

7. The star-shaped homopolymers having three branch chains produced by the process defined by claim 1.

8. The star-shaped copolymers having three branch chains produced by the process defined by claim 1.

9. The process as defined by claim 1 wherein the ramifying agent is dimethyl carbonate.

10. The process as defined by claim 1 wherein the ramifying agent is diethyl carbonate.

11. The process as defined by claim 1 wherein the ramifying agent is diphenyl carbonate.

References Cited

UNITED STATES PATENTS

| 3,135,716 | 6/1964 | Uraneck et al. | 260—45.5 |
| 3,281,383 | 10/1966 | Zelinski et al. | 260—23.7 |
| 3,551,392 | 12/1970 | Snyder et al. | 260—78.4 D |

JOSEPH L. SCHOFER, Primary Examiner

W. T. HAMROCK, Assistant Examiner

U.S. Cl. X.R.

260—78.4 D, 80.78, 82.1, 91.5, 93.5 A, 94.2 M, 94.7 A

UNITED STATES PATENT OFFICE
CERTIFICATE OF CORRECTION

PO-1050
(5/69)

Patent No. 3,773,732  Dated November 20, 1973

Inventor(s) Jean-Paul Dillenschneider

It is certified that error appears in the above-identified patent and that said Letters Patent are hereby corrected as shown below:

Column 3, lines 24-26, the formula "$-O-\underset{\underset{O}{\|}}{C}-C-\underset{\underset{O}{\|}}{C}-O-$" should be -- $-O-\underset{\underset{O}{\|}}{C}-R-\underset{\underset{O}{\|}}{C}-O-$ --; line 34, "agents" should be -- agent --; line 39, "form" should be -- from --.

Column 8, line 13, "wherey" should be -- whereby --; line 19, in the table, first column of figures, "1.14" should be -- 1.10 --;

Column 9, line 7, "$\bar{\eta}$" should be -- $\bar{\eta}o$ --; line 68, in the table, under the last column of figures, "1.72" should be -- 1.75 --. Column 11, after line 15, insert -- (1) :1 pcM is one weight part per 100 weight parts of monomer --. Column 13, Table I, under the caption "B", the figure "14.5" should be -- 14.6 --; line 70, "BL" should be -- RL --. Column 15, line 57, before "star-shaped" insert -- and --.

Signed and sealed this 3rd day of December 1974.

(SEAL)
Attest:

McCOY M. GIBSON JR.
Attesting Officer

C. MARSHALL DANN
Commissioner of Patents